(12) United States Patent
Blaire et al.

(10) Patent No.: US 12,560,258 B2
(45) Date of Patent: Feb. 24, 2026

(54) FLUIDIC COMPONENT AND DEVICE OF FLUIDIC VALVE TYPE FOR SEALING OFF

(71) Applicant: Commissariat à l'Energie Atomique et aux Energies Alternatives, Paris (FR)

(72) Inventors: Guillaume Blaire, Grenoble (FR); Manuel Alessio, Grenoble (FR); Mélissa Baque, Grenoble (FR); Jean-Maxime Roux, Grenoble (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 606 days.

(21) Appl. No.: 18/065,055

(22) Filed: Dec. 13, 2022

(65) Prior Publication Data

US 2023/0194018 A1 Jun. 22, 2023

(30) Foreign Application Priority Data

Dec. 17, 2021 (FR) ...................................... 21 13753

(51) Int. Cl.
  *F16K 99/00* (2006.01)
  *B01L 3/00* (2006.01)
(52) U.S. Cl.
  CPC .... *F16K 99/0032* (2013.01); *B01L 3/502738* (2013.01); *F16K 99/0036* (2013.01); *F16K 99/0055* (2013.01); *F16K 99/0061* (2013.01);
  *B01L 2300/18* (2013.01); *B01L 2400/0672* (2013.01); *B01L 2400/0677* (2013.01); *F16K 2099/0084* (2013.01)

(58) Field of Classification Search
  None
  See application file for complete search history.

(56) References Cited

U.S. PATENT DOCUMENTS

2007/0053800 A1 3/2007 Lehto
2007/0184547 A1 8/2007 Handique et al.

FOREIGN PATENT DOCUMENTS

WO WO 2007/044917 A2 4/2007

OTHER PUBLICATIONS

French Preliminary Search Report and Written Opinion Issued Aug. 4, 2022 in French Application 21 13753 filed on Dec. 17, 2021 (with English Translation of Categories of Cited Documents), 9 pages.

*Primary Examiner* — Lore R Jarrett
(74) *Attorney, Agent, or Firm* — Oblon, McClelland, Maier & Neustadt, L.L.P.

(57) ABSTRACT

A fluidic component intended to be associated with a heating module and in which there is formed a fluidic circuit including a fluidic channel intended for the circulation of a fluid, the fluidic channel including at least one passage for the fluid and a widened portion forming a location produced at the periphery of the passage, the component including a fluidic valve mechanism including at least an actuating element capable of expanding, trapped by at least one body made of a meltable compound in the location.

6 Claims, 2 Drawing Sheets

FLUIDIC COMPONENT AND DEVICE OF FLUIDIC VALVE TYPE FOR SEALING OFF

TECHNICAL FIELD OF THE INVENTION

The present invention relates to a fluidic component and to a device of the fluidic valve type. The device may notably comprise a reaction chamber, that can be isolated by a fluidic valve mechanism. The invention also relates to an analysis method implemented in said device.

PRIOR ART

Microfluidic devices developed for performing biological analysis may employ various methods the most sensitive among which are the biomolecular amplification methods through which a target genome sequence is replicated into a very large number of copies. This type of method is the most sensitive and the most specific for searching for target microorganisms, but replicating a genome sequence into millions of copies needs to be accompanied by measures for very strictly isolating the reaction volume. Were a small fraction of such a reaction product to be dispersed, it would contaminate its surroundings and all the detection tests performed subsequently at that location would carry a risk of testing positive. In lab-on-a-chip devices developed for biological analysis by biomolecular amplification, it is therefore important to have means for sealing off the reaction chambers.

Other types of reaction may also require the reaction products to be isolated within a micro-system, such as reactions using toxic, irritant or CMR products.

Microfluidic devices formed of a microfluidic network of microfluidic capsules and of channels connecting the capsules to one another are known from documents US2012/064597A1, US2013/130262A1, US2007/166199A1 and US2006/076068A1. Each microfluidic capsule comprises a chamber into which an inlet channel opens and from which an outlet channel emerges. A deformable membrane is commanded between two positions to confer two distinct states on the capsule: a first state in which the inlet channel communicates with the outlet channel via the chamber, allowing the transfer of fluid, and a second state in which the membrane blocks the communication between the two channels, preventing the flow of fluid and preventing the filling of the chamber of the capsule. The membrane is commanded between its two positions using pneumatic means, for example by applying a positive pressure or negative pressure to it. In order to produce these devices, the known solutions are performed using a multilayer assembly in which the deformable membrane forms an intermediate layer sandwiched between two substrates. The membrane is often bonded or fixed using a pre-cut double-sided sticky tape. In these documents, the microfluidic capsules are incorporated into microfluidic cards or cartridges which have pneumatic connectors so that they can be connected to external pressure sources and regulators. After use, the microfluidic devices are disconnected from the pressure sources and regulators so that the inbuilt pneumatic valves or capsules may be in unknown states and not guarantee the sealing-off of the microfluidic chambers the products of which could become dispersed. This disadvantage is critical when, for example, reaction products carry the risk of polluting the surroundings or contaminating future analyses.

These various valve solutions are pneumatically actuated and in order to actuate them require external means which do not guarantee that the reaction chambers are sealed off after use or even in the event of an electronic or software fault.

Patent application EP3326717A1 proposes another solution in which the valve is created by adding to a cavity a liquid that is intended to form an element made of deformable material. In that invention, the pressurizing source is not described, but the command by a plurality of modules and software proves to be complex and there is nothing to guarantee that the microfluidic chambers will be sealed off after use or even after a malfunction.

The reference document "*Closable Valves and Channels for Polymeric Microfluidic Devices*" (P. Clark & al, 2020) describes three novel approaches for sealing-off valves. The first approach consists of a chamber contiguous with the channel that is to be closed and in which the component parts of an expanding foam are mixed. The reaction produced by this mixing causes the foam to expand and seal off the channel. This approach does indeed allow passive sealing once the valve has been actuated, but by contrast does require a complex fluidic architecture in order to achieve the mixing of the component parts of the foam and in order to load these reagents. In addition, the time needed for the chemical reaction employed is of the order of ten minutes or so, which is a long time in the event of ill-timed removal of the device by the operator. The other two approaches in the document are based on the either thermal or chemical melting of a layer of polymer pierced with a hole. It is through this hole that the liquid passes when the valve is open. By heating and applying a controlled pressure to the layer around the hole (second approach) or by applying a chemical product able to dissolve the layer around the hole (third approach), the layer is locally melted, and the liquid will coalesce and plug the hole as it cools. In these two approaches, the operating conditions are complex to incorporate into a device. In the case of the thermal approach, it is effectively necessary to achieve temperatures well in excess of 100° C., which is somewhat incompatible with reactions of the biomolecular type. In the case of the chemical approach, it is relatively complex to incorporate a solvent capable of dissolving a polymer layer into a device made chiefly of polymer.

Patent application WO2007/044917A2 describes a fluidic valve mechanism.

It may be advantageous to have a solution for sealing off a microfluidic chamber, actuation of which is simple and reliable without recourse to complex means.

Moreover, it may prove relevant to have a fluidic component that incorporates a fluidic valve mechanism that can be rapidly deployed in the field.

It is a first objective of the invention first of all to propose a fluidic component that meets this need.

It is a second objective of the invention to propose a device of the fluidic valve type comprising such a fluidic component and having simple and reliable means for actuating the fluidic valve mechanism of the component.

SUMMARY OF THE INVENTION

The invention thus relates to a device of the fluidic valve type comprising:

A fluidic component in which there is formed a fluidic circuit comprising a fluidic channel intended for the circulation of a fluid, said fluidic channel comprising at least one passage for said fluid and a widened portion forming a location produced at the periphery of said passage, said component also comprising a fluidic valve mechanism comprising at least an actuating element capable of expanding, trapped by at least one body made of a meltable compound in said location, The fluidic circuit comprising a reaction chamber, the fluidic valve mechanism being arranged on a fluidic channel of the fluidic circuit opening into said reaction chamber, Said device comprising:

A heating module designed to simultaneously heat both:
Said reaction chamber in order to perform a detection reaction, and
The fluidic valve mechanism in order to expand the actuating element and cause the meltable-compound body of said fluidic valve to melt so as to initiate operation of said valve.

According to one special feature, the meltable compound is a paraffin chosen to have a melting-point temperature of between 42° C. and 70° C.

According to another special feature, the meltable compound is a paraffin selected from docosane, tricosane, tetracosane, pentacosane, hexacosane and dotriacontane.

According to another special feature, the actuating element is a bubble of gas.

According to another special feature, the component is produced in the form of a one-piece element incorporating said fluidic circuit and said fluidic valve mechanism.

The invention also relates to an analysis method implemented in a device such as defined hereinabove, said method consisting in:

activating the heating module up to at least a first temperature value high enough to initiate operation of said fluidic valve mechanism and to implement a detection reaction in said reaction chamber, seal off the reaction chamber through the solidification of the meltable compound inside the fluidic channel.

BRIEF DESCRIPTION OF THE FIGURES

Other features and advantages will become apparent from the following detailed description, which is given with reference to the appended drawings, in which.

DETAILED DESCRIPTION OF AT LEAST ONE EMBODIMENT

In the remainder of the description, the terms "upstream" and "downstream" are to be understood with regard to the direction in which the fluid circulates in the fluidic circuit concerned.

In the remainder of the description, in a fluidic valve mechanism, a valve in the open state allows the fluid to pass (state 1 or ON) and a valve in the closed state blocks the passage of the fluid (state 0 or OFF).

The invention is notably aimed at a fluidic valve mechanism 330 used in a fluidic component 1.

The fluidic component 1 may notably be used for an analysis that requires heating.

The fluidic component 1 may take the form of a single one-piece element. This element may be produced by superposing several layers.

4

Figure 1:
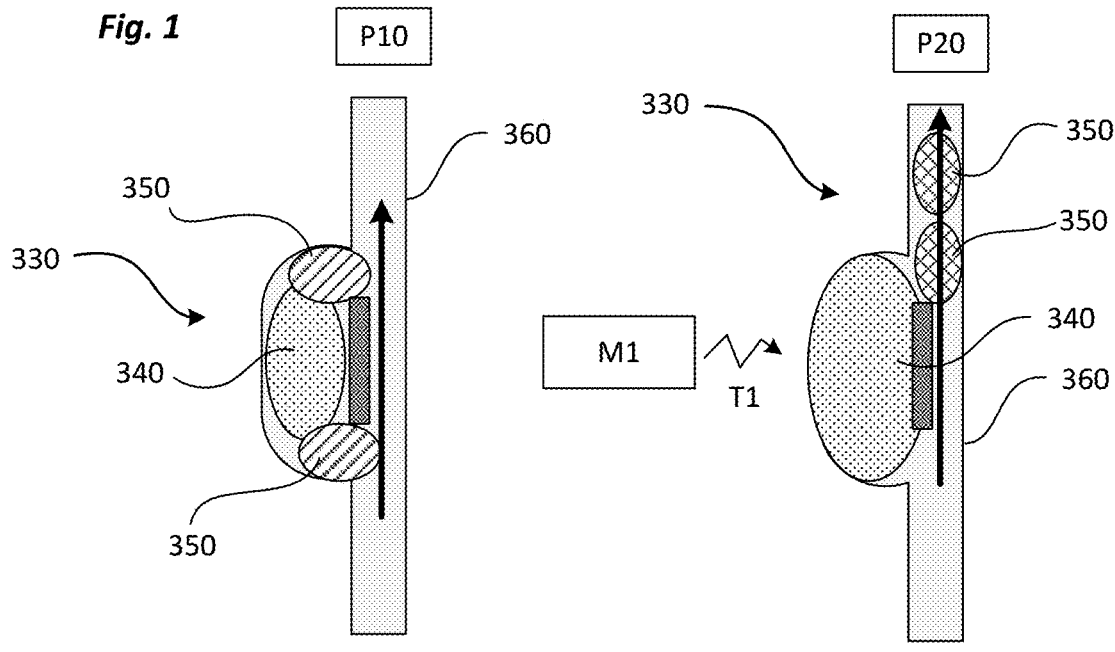
FIG. 1 illustrates the principle of operation of the device of fluidic valve type of the invention, with its fluidic valve mechanism respectively in the initial state, in the initiated state, and in the final state.
Figure 1:
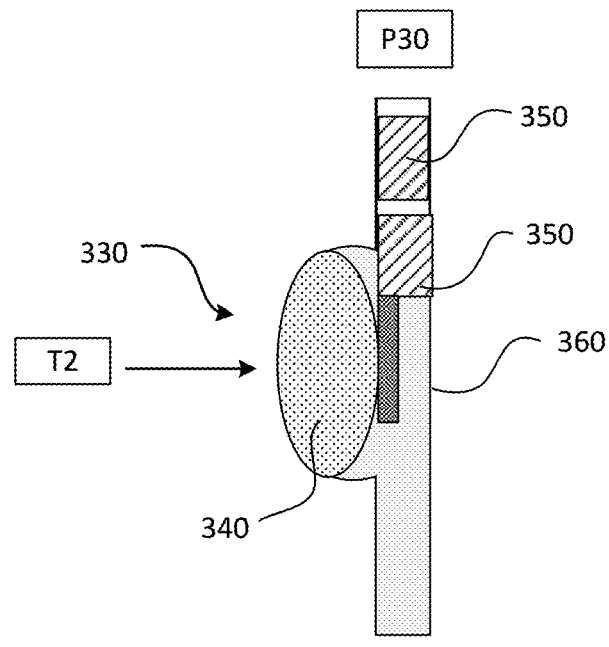

With reference to FIG. 1, the fluidic valve mechanism 330 is intended to be arranged on a fluidic circuit produced in the component 1 to control the passage of a fluid F in a fluidic channel of this fluidic circuit. The component 1 incorporates all the fluidic members of the circuit.

It should be noted that the fluidic valve mechanism 330 of the invention has irreversible operation insofar as it can enclose a fluidic channel only once and cannot return to its initial state.

With reference to FIG. 1, the fluidic valve mechanism 330 is made up of at least one body 350 (two bodies in FIG. 1) made of a meltable compound, initially trapping an element capable of expanding, in the channel 360 of the fluidic circuit concerned, for example an air bubble 340. The small volumes of this meltable compound are deposited for example using a pipette, at intended locations on the edge of the channel concerned. The siting of the air bubble 340 between the two bodies 350 made of meltable compounds in each channel is also provided for in the microfluidic circuit. These locations may be obtained for example by a machining using a milling cutter, or by laser etching, or else by the moulding of the circuit. It should be noted that the use of two bodies 350 made of the meltable compound notably makes it possible to ensure better operation of the device for sealing-off, but it must be understood that the invention remains functional with the use of just one body 350 made of meltable compound. In the latter instance, the air bubble 340 is trapped in its location by a single body 350.

The meltable compound may be a linear alkane commonly referred to as a solid paraffin, the type of paraffin being selected according to the temperature at which the compound is to melt when the method is being implemented. The fluidic valve mechanism 330 may notably be based to a large extent on the use of a paraffin capable at melting at a precise temperature, for example docosane (42-45° C.) or tetracosane (49-52° C.).

In order to initiate the fluidic valve mechanism 330, the device of the invention comprises a heating module M1. The heating module M1 is arranged and configured to heat the meltable compound to a temperature at least equal to its melting-point temperature.

The heating module M1 advantageously incorporates an electrical power supply and employs a control module M2.

The heating module M1 may be incorporated into a support onto which said fluidic component 1 fits, so that the component 1 comes in the form of an easily replaceable consumable. The support is then an assembly that is mechanically distinct from the component 1.

In a variant, the heating module M1 may be at least partially incorporated into said element forming the component 1. In the latter instance, by way of example, a resistance may be incorporated into the body of the component 1, said component 1 then fitting onto a support in order to connect said resistance to an external electrical power supply.

The heating module M1 may comprise a single electrical heating means or a plurality of electrical heating means. It may, for example, be an electrical resistance. If a plurality of means are employed, they may be all commanded.

The control module M2 is configured to control the heating module M1 with a view to adjusting and regulating the applied temperature.

According to one particular aspect of the invention, it is possible to create an entirely stand-alone marker, it being possible for the heating module M1 to be external, or incorporated into the component or assembled therewith, the same being true of the control module M2.

The principle of operation of the device is as follows:

Below its melting-point temperature (T1), the two bodies 350 remain trapped on the edge of the channel: the fluid can circulate freely (FIG. 1—P10).

Above its melting-point temperature (at the temperature T1), the second meltable compound forming the two bodies 350 melts, the air bubble 340, which is pressurized on account of the heat, can expand, pushing the two molten bodies 350 along the channel. There is no pressure in the main channel other than the hydrostatic pressure, and the molten plugs, which are subjected to Archimedean upthrust and to capillary forces, remain liquid throughout the heating time. Experimentally, it is thus found that the two molten bodies ascend a little in the channel (because paraffin is not as dense as water), the geometry of the valve encouraging this ascent (FIG. 1—P20) in the channel 360.

Upon cooling, this slight ascent of the bodies 350 is enough that when the air bubble 340 contracts, liquid from the reaction chamber 30 will fill the available space, leaving a goodly proportion of the meltable compound to solidify in the channel (FIG. 1—P30).

At high temperature, which is to say above the melting-point temperature, as they are supernatant in the channels 360 above the reaction chamber 30, the bodies 350 present in the molten state make their own contribution to limiting the evaporation of the liquid.

At low temperature, which is to say below the melting-point temperature, after the heating of the chamber 30, or after the heating cycle, the meltable compound returns to the solid state and the bodies 350 completely seal off the various channels.

The device may notably be very useful for sealing off a reaction chamber 30 liable to experience temperature cycling in order to implement a detection reaction.

Such a reaction chamber 30 may be incorporated into the component 1 and the fluidic valve mechanism 330 is then used to control fluidic access to the chamber 30. In other words, the fluidic valve mechanism 330 is arranged on a fluidic supply channel 360 opening into the reaction chamber 30. It should be noted that several channels may open into the reaction chamber 30, notably another channel used for example in a vented fluidic circuit.

The meltable compound chosen is advantageously characterized by a melting-point temperature lower than the temperature needed for the detection reaction, so that the mechanism can be initiated before any amplification.

The reaction chamber 30 is advantageously produced in the component 1. This reaction chamber 30 may hold at least some of the reagents needed for implementing the reaction.

The detection reaction performed in the chamber may notably be of biomolecular amplification type (PCR, LAMP . . . ) or may be of the immuno-enzymatic type (ELISA type).

It should be noted that analysis employing biomolecular amplification of microorganisms generally assumes the extraction of the genetic material of the microorganisms. Various technical solutions may of course be employed in order to do that.

Figure 2:
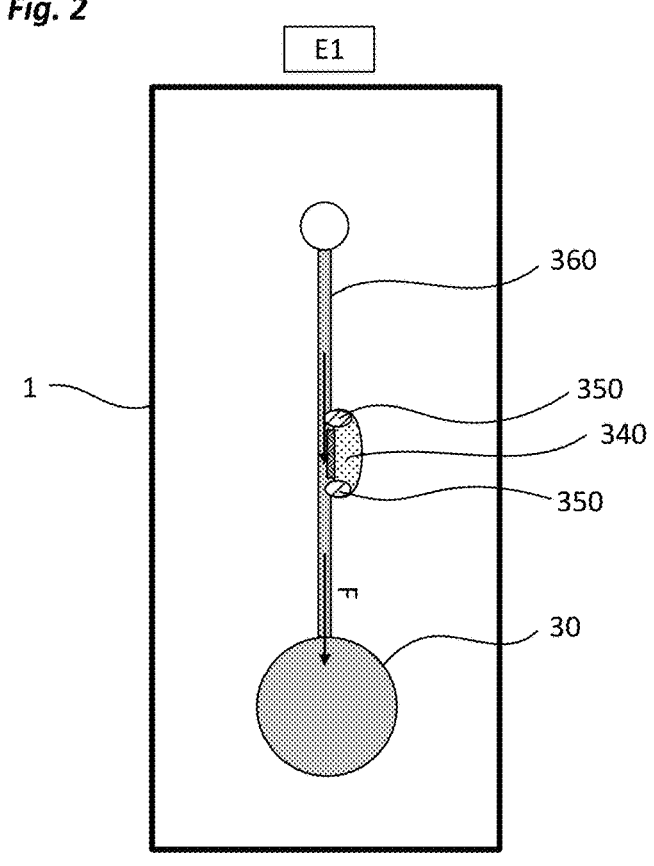
FIG. 2 shows the fluidic device according to the invention used for controlling fluidic access to a reaction chamber, with the fluidic valve mechanism respectively in the initial state, in the initiated state, and in the final state.
Figure 2:
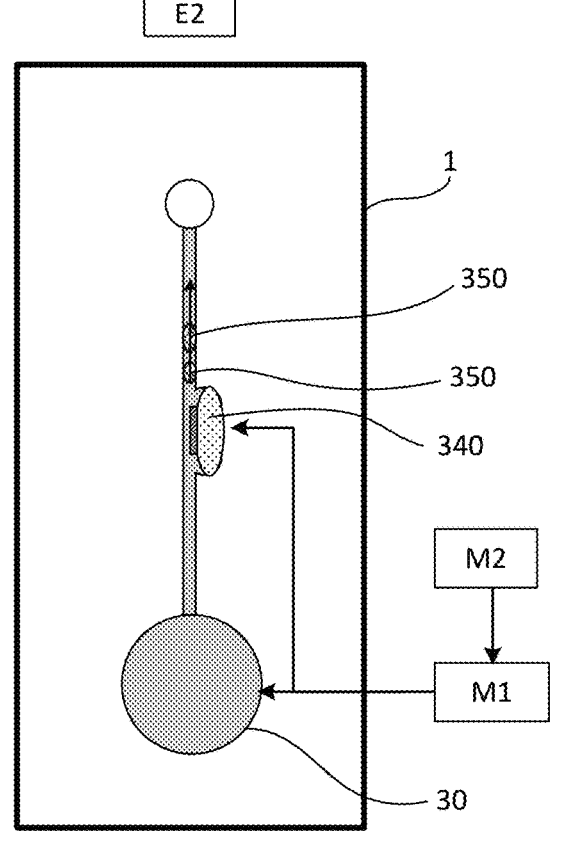
Figure 2:
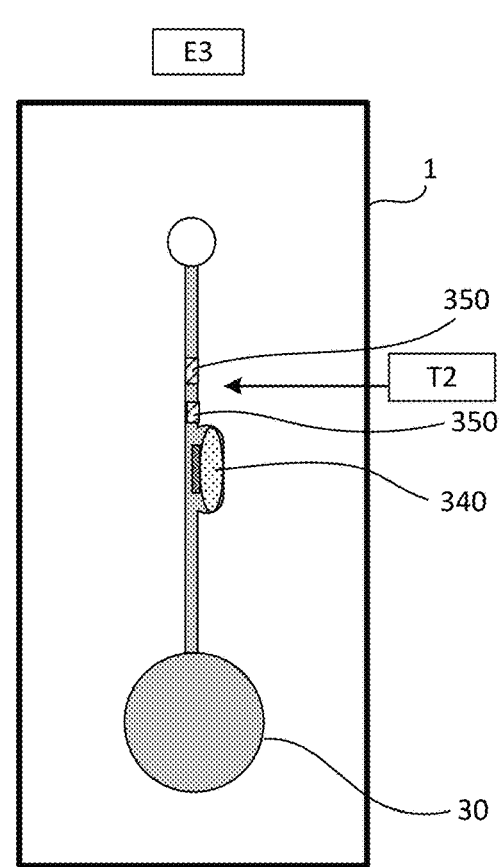

The principle of operation is described hereinbelow with reference to FIG. 2.

E1: The fluid F can circulate freely in the fluidic channel 360 supplying the reaction chamber 30.

E2: In a detection reaction, the reaction chamber 30 may undergo heating to encourage the reaction. This heating, performed by the heating module M1, is used both to encourage the reaction in the chamber and to initiate operation of the fluidic valve mechanism 330, according to the principles described hereinabove, by causing the two bodies 350 to melt.

E3: When the heating module M1 is then deactivated or commanded by M2 to heat to a lower temperature (T2), there is a cooling of the bodies 350 present in the fluidic channel 360, and these bodies then block off the channel 360 to seal off the chamber 30.

The fact that the reaction chamber 30 needs to be heated in order to implement the reaction is then used for also initiating the operation of the fluidic valve mechanism 330 of the invention by causing the meltable compound to melt. This principle means that the means employed can be shared between multiple functions and offers additional safety with respect to contamination of the working environment.

The solution of the invention can be differentiated from the earlier solutions through the fact that it does not use external pneumatic solutions in order to operate, neither does it have any additional reagents to be loaded into it.

It must be appreciated that the component 1 may of course incorporate other fluidic circuits.

The invention claimed is:

1. A device, comprising:
a fluidic component in which there is formed a fluidic circuit comprising a fluidic channel intended for the circulation of a fluid, said fluidic channel comprising at least one passage for said fluid and a widened portion positioned at a periphery of said at least one passage, said component also comprising a fluidic valve mechanism comprising at least an actuating element capable of expanding, trapped by at least one body made of a meltable compound in said location,
the fluidic circuit comprising a reaction chamber, the fluidic valve mechanism being arranged on the fluidic channel of the fluidic circuit opening into said reaction chamber,
a heating module designed simultaneously to heat both the reaction chamber in order to perform a detection reaction, and the fluidic valve mechanism in order to expand the actuating element and cause the meltable-compound body of said fluidic valve mechanism to melt so as to initiate operation of said fluidic valve mechanism.

2. The device according to claim 1, wherein the meltable compound is a paraffin chosen to have a melting-point temperature of between 42° C. and 70° C.

3. A component according to claim 2, wherein the meltable compound is a paraffin selected from docosane, tricosane, tetracosane, pentacosane, hexacosane and dotriacontane.

4. The device according to claim 1, wherein the actuating element is a bubble of gas.

5. The device according to claim 1, wherein the component is produced in the form of a one-piece element incorporating said fluidic circuit and said fluidic valve mechanism.

6. An analysis method implemented in a device as defined in claim 1, wherein the method comprises:
activating the heating module up to at least a first temperature value high enough to initiate operation of said fluidic valve mechanism and to implement a detection reaction in said reaction chamber,
seal off the reaction chamber through the solidification of the meltable compound inside the fluidic channel.

* * * * *